United States Patent
Tong

(10) Patent No.: US 9,280,233 B1
(45) Date of Patent: Mar. 8, 2016

(54) ROUTING FOR TOUCH SENSOR ELECTRODES

(71) Applicant: Synaptics Incorporated, San Jose, CA (US)

(72) Inventor: Tony Tong, Elk Grove, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 0 days.

(21) Appl. No.: 14/581,658

(22) Filed: Dec. 23, 2014

(51) Int. Cl.
*G06F 3/00* (2006.01)
*G06F 3/041* (2006.01)
*G06F 3/044* (2006.01)
*G06F 3/045* (2006.01)

(52) U.S. Cl.
CPC .............. *G06F 3/0416* (2013.01); *G06F 3/044* (2013.01); *G06F 3/045* (2013.01); *G06F 2203/04103* (2013.01); *G06F 2203/04112* (2013.01)

(58) Field of Classification Search
CPC ....... G06F 3/045; G06F 3/044; G06F 3/0416; G06F 3/041; G02F 1/1333
USPC ....................... 257/216; 349/12, 96
See application file for complete search history.

(56) References Cited

U.S. PATENT DOCUMENTS

| | | | |
|---|---|---|---|
| 5,920,309 A | 7/1999 | Bisset et al. | |
| 7,714,847 B2 | 5/2010 | Hsu et al. | |
| 8,446,386 B2 | 5/2013 | Hamblin et al. | |
| 8,507,800 B2 | 8/2013 | Long et al. | |
| 8,576,193 B2 | 11/2013 | Hotelling | |
| 8,593,413 B2 | 11/2013 | Chuang | |
| 2008/0180584 A1* | 7/2008 | Utsunomiya | G06F 3/044 349/12 |
| 2008/0309633 A1 | 12/2008 | Hotelling et al. | |
| 2011/0057899 A1* | 3/2011 | Sleeman | G01L 1/146 345/174 |
| 2012/0081646 A1* | 4/2012 | Mizoguchi | G02F 1/136286 349/122 |
| 2012/0229417 A1 | 9/2012 | Badaye | |
| 2012/0229736 A1* | 9/2012 | Osaki | G02F 1/133512 349/96 |
| 2012/0299842 A1 | 11/2012 | Liu | |
| 2013/0038542 A1* | 2/2013 | Kim | G06F 3/041 345/173 |
| 2013/0257519 A1 | 10/2013 | Chuang et al. | |
| 2013/0278513 A1* | 10/2013 | Jang | G06F 3/044 345/173 |
| 2013/0328806 A1* | 12/2013 | Tsai | G06F 3/041 345/173 |
| 2013/0335684 A1* | 12/2013 | Yoshikawa | G02F 1/1333 349/96 |
| 2014/0152916 A1* | 6/2014 | Nakamura | G06F 3/041 349/12 |
| 2014/0176486 A1 | 6/2014 | Lee et al. | |
| 2014/0184950 A1 | 7/2014 | Chu et al. | |
| 2014/0204290 A1* | 7/2014 | Chen | G06F 3/044 349/12 |
| 2014/0293168 A1* | 10/2014 | Tsai | G06F 3/041 349/12 |

FOREIGN PATENT DOCUMENTS

CN 102073431 A 5/2011

* cited by examiner

*Primary Examiner* — Nathan Ha
(74) *Attorney, Agent, or Firm* — Patterson & Sheridan, LLP

(57) ABSTRACT

An input device for capacitive sensing. The input device includes a plurality of sensor electrodes for capacitive sensing disposed in a first layer and within a sensor electrode region comprising an areal extent of the plurality of sensor electrodes. The input device also includes a plurality of routings disposed in a second layer and within a border region of the sensor electrode region, the plurality of routings layered with a first set of two or more of the plurality of sensor electrodes in the border region and electrically coupled to a second set of two or more of the plurality of sensor electrodes, wherein the second set of two or more of the plurality of sensor electrodes includes zero, one, or two of the sensor electrodes included in the first set of two or more of the plurality of sensor electrodes.

20 Claims, 6 Drawing Sheets

ROUTING FOR TOUCH SENSOR ELECTRODES

BACKGROUND

1. Field of the Disclosure

Embodiments generally relate to input sensing and, in particular, to improved routing for touch sensor electrodes.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensor devices generally include sensor electrodes for sensing the presence of input objects. A processing system drives the sensor electrodes and receives signals with the sensor electrodes. The processing system also processes the signals received with the sensor electrodes in order to detect the presence of input objects.

Traces are disposed between the processing system and the sensor electrodes in order to convey the electrical signals between the processing system and the sensor electrodes. These traces are routed through particular regions of the proximity sensor device. Poor placement of the traces may increase the cost, difficulty, and/or speed of manufacturing and designing the proximity sensor device. Thus, it is important to have good placement of such traces within a proximity sensor device.

SUMMARY

One example disclosed herein includes an input device. The input device includes a plurality of sensor electrodes disposed in a first layer and within a sensor electrode region. The input device also includes a plurality of routings disposed in a second layer and within an overhang region. The plurality of routings are layered with a first set of two or more of the plurality of sensor electrodes in the overhang region and electrically coupled to a second set of two or more of the plurality of sensor electrodes. The second set of two or more of the plurality of sensor electrodes includes zero, one, or two of the sensor electrodes included in the first set of two or more of the plurality of sensor electrodes. The input device further includes a plurality of display elements disposed in a viewable region, the viewable region being located within and being smaller than the sensor electrode region. The overhang region comprises an area that includes a portion of the sensor electrode region but does not include the viewable region.

Another example disclosed herein includes an input device. The input device includes a plurality of sensor electrodes for capacitive sensing disposed in a first layer and within a sensor electrode region comprising an areal extent of the plurality of sensor electrodes. The input device also includes a plurality of routings disposed in a second layer and within a border region of the sensor electrode region. The plurality of routings are layered with a first set of two or more of the plurality of sensor electrodes in the border region and electrically coupled to a second set of two or more of the plurality of sensor electrodes. The second set of two or more of the plurality of sensor electrodes includes zero, one, or two of the sensor electrodes included in the first set of two or more of the plurality of sensor electrodes.

A further example disclosed herein includes method for performing capacitive sensing in an input device. The method includes identifying a sensor electrode for capacitive sensing, the sensing electrode being included in a plurality of sensor electrodes of the input device. The method also includes driving the sensor electrode with a sensing signal for capacitive sensing, the sensing electrode being included in a plurality of sensor electrodes of the input device. The plurality of sensor electrodes are disposed in a first layer and within a sensor electrode region. A plurality of routings are disposed in a second layer and within an overhang region. The plurality of routings are layered with a first set of two or more of the plurality of sensor electrodes in the overhang region and electrically coupled to a second set of two or more of the plurality of sensor electrodes. The second set of two or more of the plurality of sensor electrodes includes zero, one, or two of the sensor electrodes included in the first set of two or more of the plurality of sensor electrodes. A plurality of display elements are disposed in a viewable region, the viewable region being located within and being smaller than the sensor electrode region. The overhang region comprises an area that includes a portion of the sensor electrode region but does not include the viewable region.

BRIEF DESCRIPTION OF THE DRAWINGS

The preferred exemplary embodiment of the present invention will hereinafter be described in conjunction with the appended drawings, where like designations denote like elements and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments provide a capacitive sensing device configured for capacitive sensing of input objects that includes traces for coupling to sensor electrodes that are at least partially disposed within an overhang region of the sensor device. In an example, an input device includes a plurality of sensor electrodes disposed within a sensor electrode region. An overhang region that is within the sensor electrode region but that does not extend to the center of the sensor electrode region includes traces that are coupled to the sensor electrodes. The overhang region does not include a display of the electronic system. Therefore, the overhang region may include opaque materials and/or materials that may obscure the view of a user. The sensor electrode region also includes a viewable region which also includes sensor electrodes, but, in contrast to the overhang region, the display of the electronic system is located in the viewable. Therefore, components and materials in the viewable region are designed to have little, if any, impact on the visibility of the display for the user. The traces may be doubly routed to the sensor electrodes in order to reduce the electrical resistance experienced by signals traveling to and from the sensor electrodes. The double routing may help when the sensor electrodes are constructed out of a transparent conducting oxide such as indium tin oxide (ITO), which has a relatively high resistance (in general, substantially higher than the resistance of metals). ITO may be used for sensor electrodes or traces that are in the viewable region in order to minimize impact on a user's visibility of the display. The overhang region may be defined as an area of the capacitive sensing device that is within the sensor electrode region but that does not include viewable display components. With the overhang region defined as the area that includes sensor electrodes but not viewable display elements, metal traces for routing can be placed within this overhang region because this region does not have a requirement that conductive materials placed within this region have minimal impact on visibility (for example, transparent conducting oxide ITO). This requirement does not exist because nothing is being displayed within this overhang region.

Figure 1:
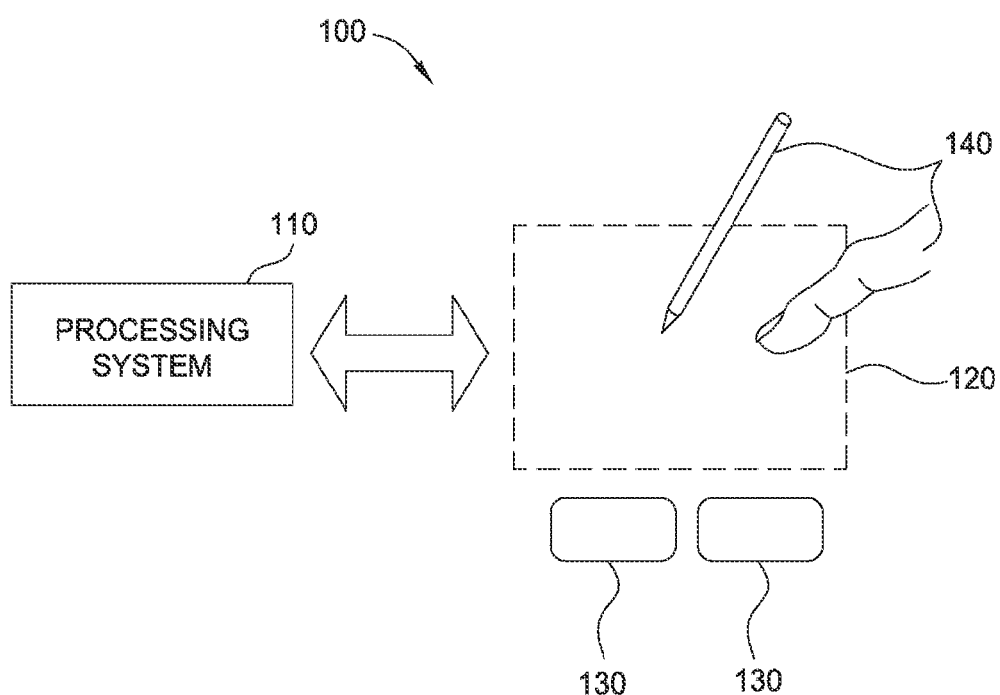
FIG. 1 is a block diagram of an exemplary system that includes an input in accordance with an embodiment of the invention.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
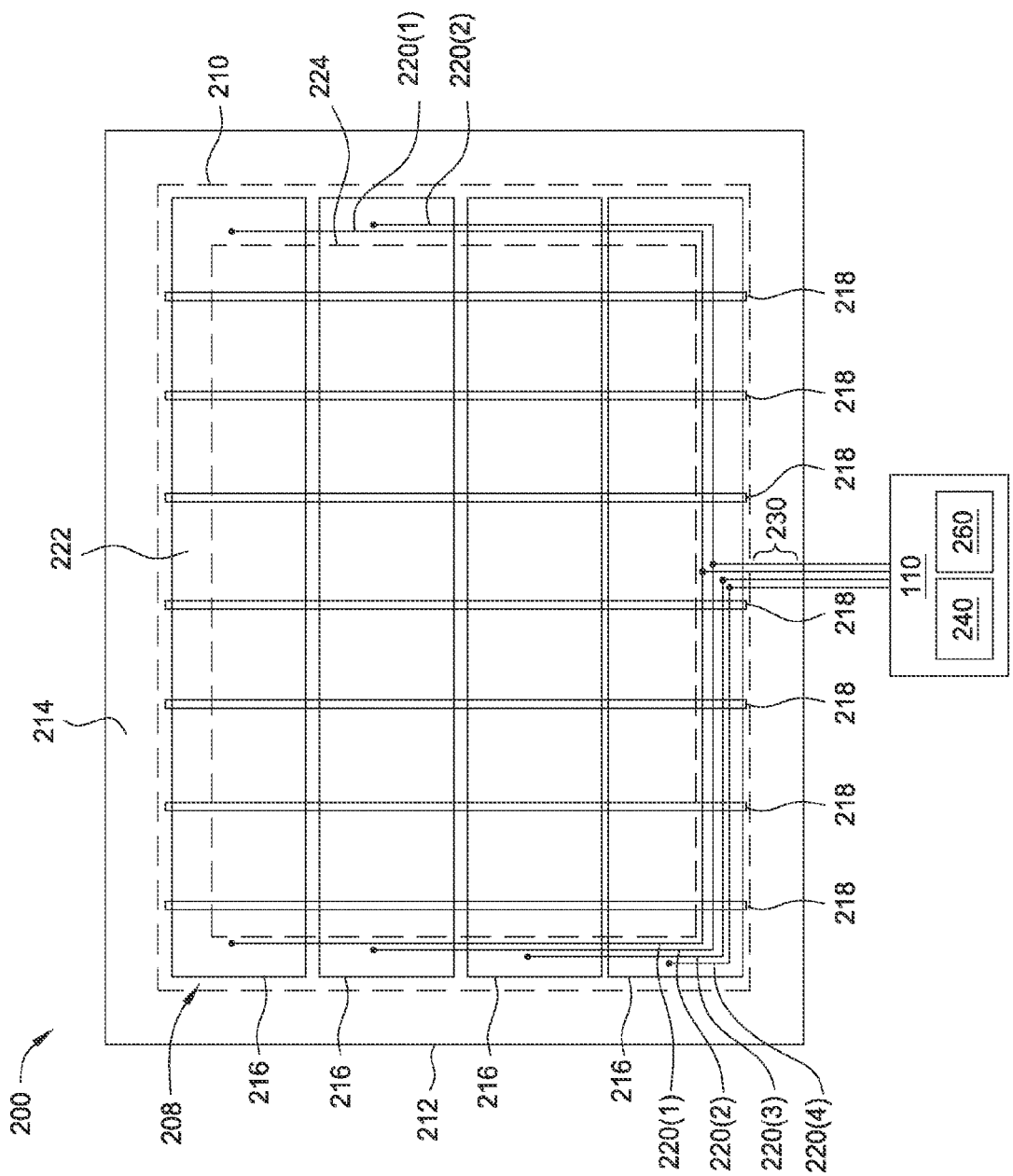
FIG. 2 is a block diagram depicting a capacitive sensor device according to an example implementation

FIG. 2 is a block diagram depicting a capacitive sensor device 200 according to an example implementation. The capacitive sensor device 200 comprises an example implementation of the input device 100 shown in FIG. 1. The capacitive sensor device 200 includes a sensor electrode collection 208 disposed on a substrate 212 within a sensor electrode region 210. The sensor electrode collection 208 includes a number of sensor electrodes for performing capacitive sensing. The sensor electrode region 210 comprises the areal extent of the sensor electrode collection 208 on the substrate 212. A perimeter portion of the areal extent of the substrate 212 that circumscribes (and thus does not include) a central region is referred to as a border region 214 herein. In some embodiments, the amount of substrate 212 that lies beyond the sensor electrode region is minimal or non-existent. In cases where no substrate 212 lies beyond the sensor electrode region 210, the border region 214 would include elements other than the substrate 212 that lies beyond the sensor electrode region 210. In any case, the border region 214 could include substrate 212 and/or other elements that lie beyond sensor electrode region 210. The sensor electrode collection 208 is coupled to the processing system 110 (shown in FIG. 1, and not shown in FIG. 2).

The sensor electrode collection 208 includes a plurality of transmitter electrodes 216 and a plurality of receiver electrodes 218 disposed perpendicularly to the transmitter electrodes 216. The term "sensor electrodes" as used herein refers to either or both of transmitter electrodes 216 and receiver electrodes 218. The sensor electrodes function as sensing elements of the sensor electrode collection 208. The sensor electrodes are separated from one another by a dielectric (not shown).

Figure 3:
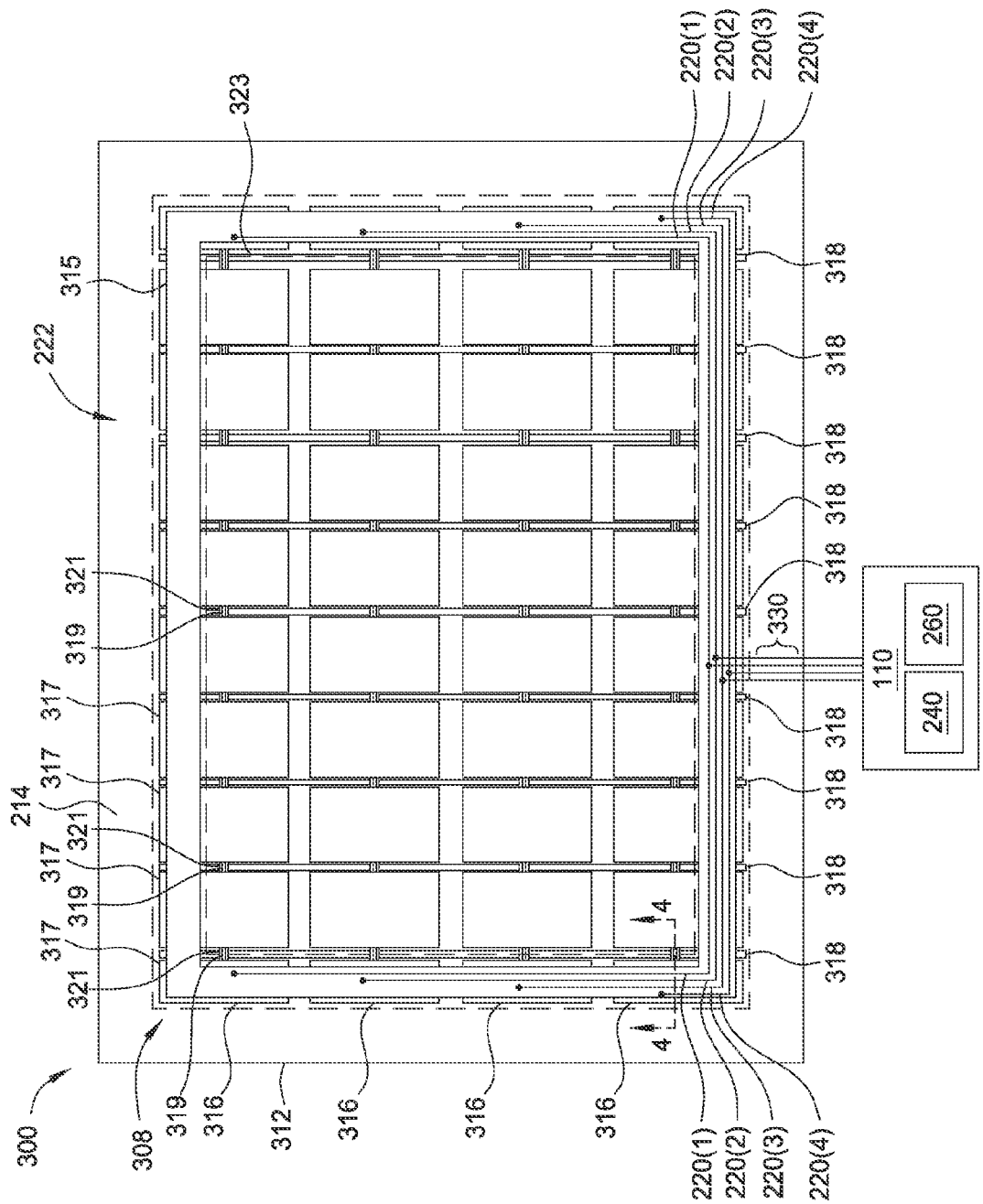
FIG. 3 is a block diagram depicting a capacitive sensor device according to an example implementation.

In FIG. 2, the transmitter electrodes 216 are substantially wider and more closely distributed than the receiver electrodes 218, which are thinner and more sparsely distributed. However, other configurations are possible. For example, in one configuration, receiver electrodes 218 may be wider and/or more closely distributed than as shown in FIG. 2 and FIG. 3. Alternatively, the transmitter electrodes 216 and the receiver electrodes 218 can have the same width and/or the same distribution.

Additionally, in the example configuration depicted in FIG. 2, the sensor electrodes are arranged in a rectangular matrix pattern. The sensor electrodes may be arranged in other patterns, such as polar arrays, repeating patterns, non-repeating patterns, or like type arrangements. It is to be understood that the sensor electrode collection 208 is not limited to the particular arrangements illustrated in the Figures provided herein, but instead can include numerous sensor patterns.

The capacitive sensor device 200 can be utilized to communicate user input (e.g., a user's finger, a probe such as a stylus, and/or some other external input object) to an electronic system (e.g., computing device or other electronic device). For example, the capacitive sensor device 200 can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the capacitive sensor device 200 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In general, the processing system 110 excites or drives sensing elements of the sensor electrode collection 208 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110 drives sensing element(s) of the sensor electrode collection 208 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110 can determine measurement(s) of capacitance from the sensed charge. In another example, the processing system 110 drives sensing element(s) of the sensor electrode collection 208 with charge and senses resulting respective voltage on sensing element(s). That is, the sensing signal is a signal to cause accumulation of charge (e.g., current signal) and the resulting signal is a voltage signal. The processing system 110 can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110 can include a sensor module 240 and a determination module 260. The sensor module 240 and the determination module 260 comprise modules that perform different functions of the processing system 110. In other examples, different configurations of one or more modules can perform the functions described herein. The sensor module 240 and the determination module 260 can include circuitry and can also include firmware, software, or a combination thereof operating in cooperation with the circuitry.

The sensor module 240 selectively drives sensing signal(s) on one or more sensing elements of the sensor electrode collection 208 over one or more cycles ("excitation cycles") in accordance with one or more schemes ("excitation schemes"). During each excitation cycle, the sensor module 240 can selectively sense resulting signal(s) from one or more sensing elements of the sensor electrode collection 208. Each excitation cycle has an associated time period during which sensing signals are driven and resulting signals measured.

In one type of excitation scheme, the sensor module 240 can selectively drive sensing elements of the sensor electrode collection 208 for absolute capacitive sensing. In absolute capacitive sensing, the sensor module 240 drives selected sensing element(s) with an absolute sensing signal and senses resulting signal(s) from the selected sensing element(s). In such an excitation scheme, measurements of absolute capacitance between the selected sensing element(s) and input object(s) are determined from the resulting signal(s).

In another type of excitation scheme, the sensor module 240 can selectively drive sensing elements of the sensor electrode collection 208 for transcapacitive sensing. In transcapacitive sensing, the sensor module 240 drives selected transmitter electrodes 216 with transmitter signal(s) and senses resulting signals from selected receiver electrodes 218. In such an excitation scheme, measurements of transcapacitance between transmitter electrodes 216 and receiver electrodes 218 are determined from the resulting signals.

In any excitation cycle, the sensor module 240 can drive sensing elements of the sensor electrode collection 208 with other signals, including reference signals and guard signals. That is, those sensing elements of the sensor electrode collection 208 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

"System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200 can be located proximate to such a system ground electrode (e.g., located above a ground plane or backplane).

The determination module 260 performs capacitance measurements based on resulting signals obtained by the sensor module 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a transmitter electrode 216 and a receiver electrode 218 affected by input object(s). In another example, a capacitive pixel can correspond to an absolute capacitance of a sensor electrode. The determination module 260 can determine an array of capacitive coupling changes using the resulting signals obtained by the sensor module 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110 can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes to produce capacitive profile(s). The array of capacitive coupling changes can include a number of points less than or equal to the number of sensor electrodes along the given axis.

Measurement(s) of capacitance by the processing system 110, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type.

To couple sensor electrodes to the processing system 110, a plurality of routings 220 are disposed on the substrate 212.

The plurality of routings 220 is disposed within an overhang region 222. The overhang region 222 constitutes an area within the sensor electrode region 210 that does not extend into a central area 224. In other words, the overhang region 222 is a region that exists within a border area of the sensor electrode region 210, but not within the central area 224. Thus, the overhang region 222 generally constitutes a border area or region of the sensor electrode region 210. The width of the overhang region 222 may, in some embodiments, be between 1.0 mm and one half of the sensor pitch. The central area 224, of course, constitutes an area towards the center of the sensor electrode collection 208 that is disposed inward of the overhang region 222. The central area 224 may include display elements and therefore may be a "viewable area" or "viewable region." More specifically, in embodiments that include display elements, the central area 224 may be the region through which the display elements are substantially viewable by a user, and thus may be called a "viewable area," while areas outside of the central area 224 are not viewable by a user and thus are not considered a viewable area or viewable region. Any or each of the routings 220 may constitute double routings, which couple both ends of a sensor electrode to the processing system 110, or may constitute single routings, which couple only one end of a sensor electrode to the processing system 110. For example, routing 220(1) and routing 220(2) constitute double routings while routing 220(3) and routing 220(4) constitute single routings. The routings 220 are disposed within overhang region 222, instead of border region 214, so that the space within border region 214 is available for other components. In other embodiments, the border region 214 may be reduced in size or eliminated due to placement of the routings 220 in the overhang region rather than the border region. It should also be noted that routing may be placed in the overhang region 222 and the border region 214 concurrently. The routings 220 may generally be disposed in a different layer than the layers in which sensor electrodes are disposed. Thus, the routings 220 may be considered to be "layered" with the sensor electrodes, meaning that the routings 220 are "above" or "over" the sensor electrodes but are within a different layer. A dielectric layer (not shown in FIG. 2) is disposed in between the sensor electrodes and the routings 220 in order to prevent the routings 220 from electrically shorting to the sensor electrodes. Openings may exist in the dielectric layer to electrically couple the routings 220 to the sensor electrodes. Because the routings 220 are disposed within the overhang region 222, space within the border region 214 is available for components other than the routings 220. To double route the transmitter electrodes 216, the routings 220 may be disposed in at least a "U"-shaped arrangement on the periphery of the sensor electrode region 210 within the overhang region 222. A portion of the routings—a "border region portion 230" is disposed within the border region 214." Because double routing is done mostly within overhang region 222, the border region portion 230 does not consume substantial space within border region 214.

FIG. 3 is a block diagram depicting a capacitive sensor device 300 according to an example implementation. The capacitive sensor device 300 comprises another example implementation of the input device 100 shown in FIG. 1. The capacitive sensor device 300 includes a collection of sensor electrodes 308. The collection of sensor electrodes 308 includes a plurality of transmitter electrodes 316 disposed perpendicularly to a plurality of receiver electrodes 318. The transmitter electrodes 316 comprise a plurality of sensor electrode elements 317 that are coupled together via jumpers 319. The jumpers 319 generally comprise conductive materials placed to couple two other conductive elements together. In general, jumpers 319 couple two conductive elements that exist in one (or more) layer through a different layer in which those conductive elements do not exist. Jumpers 319 may be used to couple two conductive elements together due to an "obstacle," such as another conductive element, being present in the layer in which the conductive elements are to be coupled together. The jumpers 319 overlap and are separated from receiver electrodes 318 via dielectric segments 321.

Because the capacitive sensor device 300 includes display elements, the sensor electrodes included in the sensor electrode collection 308 are transparent, or apparently so to the naked eye of a user. In some embodiments, the sensor electrodes may include a transparent conductive material such as indium tin oxide (ITO). Such transparent conductive material generally has a resistance that is substantially higher than the resistance of a metallic conductor. For example, ITO has an electrical resistivity of $5 \times 10^{-4}$ $\Omega$cm while copper has an electrical resistivity of $1.68 \times 10^{-10}$ $\Omega$cm. Because of this relatively low conductivity, coupling a double routing to the sensor electrodes may generally improve the ability to sense with the sensor electrodes. In some embodiments, the display elements may include one or more light-emitting elements, filter elements, selectively transmissive elements, switch elements such as transistors, and so on. Routing to sensor electrodes may be accomplished using material with a higher conductivity than the sensor electrodes. For example, a metal routing may be coupled to an ITO sensor electrode. To further overcome a sensor electrode's high resistance, double routing may be used to couple with the sensor electrode at two points, e.g., at opposite ends of the sensor electrode. While routing material is described as metal, according to some embodiments, other materials may be used. In most cases, a routing material is selected which has a lower resistance than the resistance of the sensor electrodes.

In prior art arrangements, double routings would be placed within the border region 214. However, placement of double routings within the border region consumes valuable space within that border region 214 that could be used for other elements of the capacitive sensor device 300, or inhibit reduction of the size of the border region 214. Thus, as with the capacitive sensor device 200, the traces of routings 220 are not disposed within a border region 214 of the substrate 212. More specifically, the capacitive sensor device 300 includes routings 220 in an overhang region 222. With capacitive sensor device 300, the overhang region 222 includes the portion of the sensor electrode region 210 that does not include display elements (not shown) which are disposed within display element region 323. Display element region 323 is a region of capacitive sensor device 300 through which the display elements are viewable by a user and thus may also be referred to herein as a viewable region.

To prevent the routings 220 from electrically shorting to the transmitter electrodes 316 or the receiver electrodes 318, a segment of dielectric material 315 is disposed between the sensor electrodes and the routings 220. Openings may exist in the dielectric material 315 to electrically couple the routings 220 to the sensor electrodes. The segment of dielectric material 315 between the transmitter electrodes 316 and the routings 220 may be in the same layer as the dielectric segment 321 between the jumpers 319 and the transmitter electrodes 316. Additionally, the routings 220 may be in the same layer as the jumpers 319, or at least a portion of one or more jumpers as a jumper may span multiple layers. Further, the width of the dielectric material 315 may vary at different locations based on the number of routings 220 disposed on the dielectric material 315. More specifically, the dielectric material 315 may have a smaller width where there are fewer routings 220 and a larger width where there are more routings 220.

Figure 4:
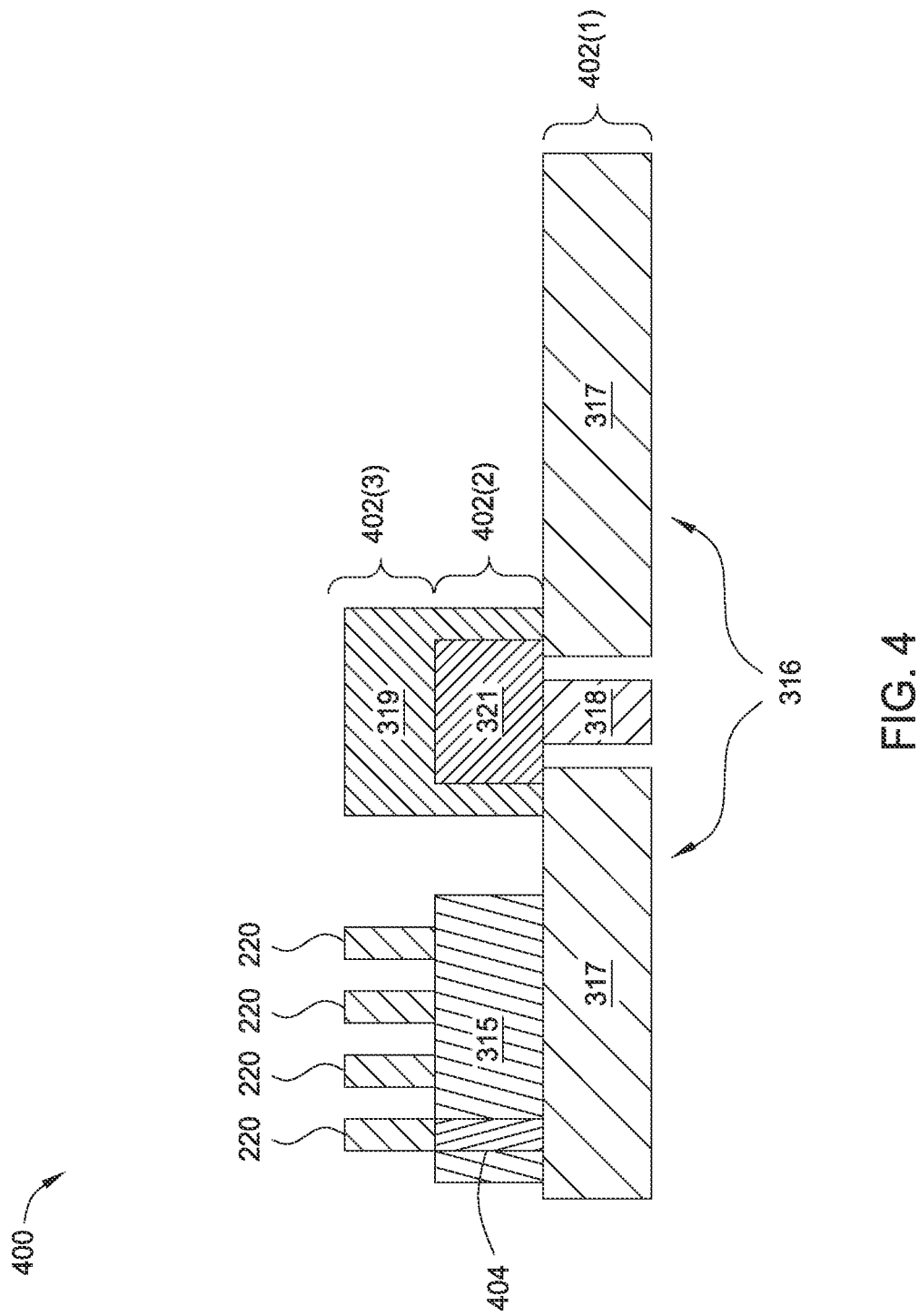
FIG. 4 is a sectional view of a portion of the capacitive sensor device of FIG. 3, taken along lines 4-4 according to an example implementation.
Figure 5:
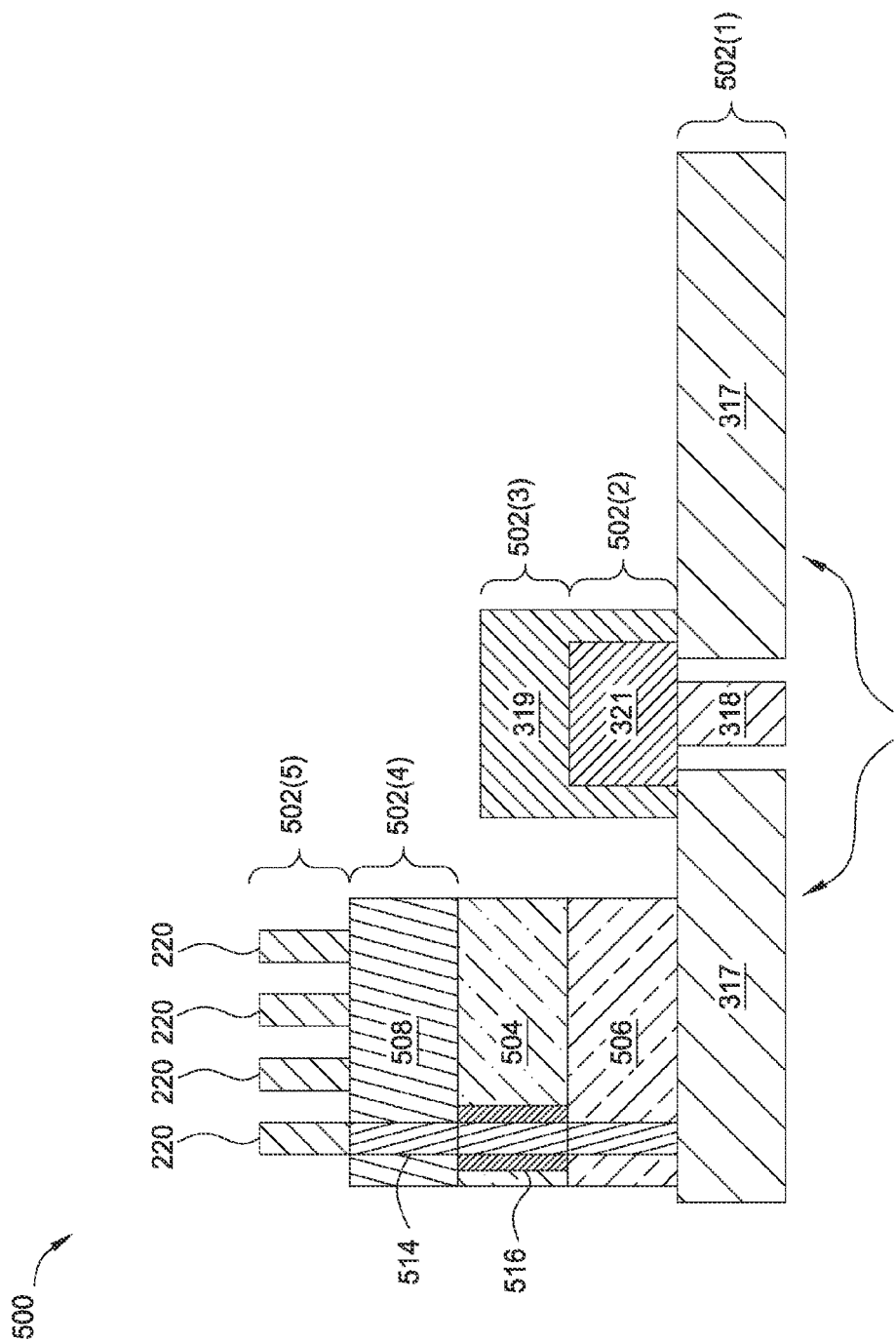
FIG. 5 is a sectional view of another example of a portion of the capacitive sensor device of FIG. 3, taken along lines 4-4 according to another example implementation.

The capacitive sensor device 300 that is illustrated in FIG. 3 may have a number of different layer-by-layer configurations. FIG. 4 illustrates a layer-by-layer configuration that does not include a shield between the routings 220 and the sensor electrodes and FIG. 5 illustrates a layer-by-layer configuration that does include a shield between the routings 220 and the sensor electrodes.

A portion of the routings—a "border region portion 330" is disposed within the border region 214." Because double routing is done mostly within overhang region 222, the border region portion 330 does not consume substantial space within border region 214.

FIG. 4 is a sectional view of a portion 400 of the capacitive sensor device 300 of FIG. 3, taken along lines 4-4. This portion 400 shows one configuration of an ordering of layers 402 in which the elements depicted in FIG. 3 are disposed.

A first layer 402(1) includes the sensor electrodes—specifically, the transmitter electrodes 316 and the receiver electrodes 318. A second layer 402(2), disposed on the first layer 402(1), includes the segment of dielectric material 315 and the dielectric segments 321 for the jumpers 319. A third layer 402(3), disposed on the second layer 402(2), includes the routings 220 and the jumper 319.

The dielectric segment 321 of course allows the jumper 319 to couple segments 317 of the transmitter electrode 316 together without connecting to the receiver electrode 318. The segment of dielectric material 315 allows the routings 220 to be disposed over the transmitter electrode 316 within the overhang region 222, which includes sensor electrodes.

One example technique for manufacturing a capacitive sensor device 300 with the configuration illustrated in FIG. 4 is now provided. A transparent conductive material such as ITO may be laid down on a substrate to form the transmitter and receiver electrodes. Subsequently, a dielectric layer is laid down to form the dielectric segment 321 (which will be under the jumper 319 when the jumper 319 is laid down) and the dielectric segment 315 (which will be under the routings 220 when the routings 220 are laid down). Then, a metal layer is laid down to form the jumper 319 over the dielectric segment 321 and to form the routings 220 over the dielectric segment 315. Another metal layer may be printed in the border region 214 (shown in FIGS. 2 and 3) to route the routings 220 to the processing system (not shown). The portion that is printed in the border region 214 constitutes the border region portion 230, 330 of the routings 220.

In another example technique, the jumpers 319 are made from a transparent conductive material such as ITO and not metal. Thus, the jumpers 319 are not laid down with the routings 220 as described above. In this example technique, a transparent conductive material such as ITO is laid down to form the transmitter electrodes 316 and receiver electrodes 318. A dielectric material is laid down to form the dielectric segment 321 and the dielectric segment 315. Another transparent conductive material is laid down to form the jumper 319 connecting segments for the transmitter electrodes 316. A metal layer is printed to form the routings 220 in the overhang region 222 and to route the routings 220 to the processing system (not shown). A via 404 within dielectric segment 315 couples routings 220 to transmitter electrode 316. The portion that is printed in the border region 214 constitutes the border region portion 230, 330 of the routings 220.

FIG. 5 is a sectional view of another example configuration for a portion 500 of the capacitive sensor device 300 of FIG. 3, taken along lines 4-4. This portion 500 shows a configuration of an ordering of the layers 502 in which the elements depicted in FIG. 3 are disposed. In addition to the elements illustrated in FIG. 4, FIG. 5 also illustrates a shield 504. The purpose of the shield 504 is to electrically isolate the routings 220 from the receiver electrodes 318. More specifically, when the processing system 110 is driving transmitter electrodes 316 with signals for capacitive sensing, those signals pass through the routings 220. Thus, without shield 504, signals from the routings 220 could be received by receiver electrode 318 in a way that would interfere with sensing of input objects 140. With the shield 504, however, the effect of signals passing through routings 220 on the receiver electrodes 318 is reduced.

The shield 504 is made of a conducting material, such as a metal or a transparent conductive oxide (e.g., indium tin oxide), and may be formed as solid strip, a mesh, or any other configuration which is capable of blocking electromagnetic fields. In addition, although the shield 504 is shown as having a particular shape, the shield 504 may be formed in any shape which effectively shields the receiver electrodes 318 from the routings 220.

The shield 504 may be driven with a shield signal, such as a system ground of the device. In other embodiments, the shield 504 is driven with a constant voltage signal or with any other signal able to sufficiently shield the routings 220. The shield 504 may be coupled the processing system 110, which may be configured to drive the shield 504.

So that the shield 504 is not shorted to the transmitter electrodes 316 or routings 220, a dielectric layer 506 is disposed over transmitter electrode 316. Another dielectric layer 508 is disposed over the shield 504 and below the routings 220 so that routings 220 are not electrically shorted to the shield 504. As with the portion of the capacitive sensing device illustrated in FIG. 4, in FIG. 5, a dielectric segment 321 is disposed on the transmitter electrode 316 and a jumper 319 is disposed on the dielectric segment 321 to couple the segments of the transmitter electrode 316 together.

For additional clarity, a layer-by-layer description of the portion of the capacitive sensing device illustrated in FIG. 5 is now provided. A first layer 502(1) includes transmitter electrodes 316 and the receiver electrode 318. A second layer 502(2) includes the dielectric layer 506 disposed under the shield 504 and the dielectric segment 321 disposed under the jumper 319. A third layer 502(3) includes the shield 504 and the jumper 319. A fourth layer 502(4) includes the dielectric layer 508. A fifth layer 502(5) includes the routings 220 disposed on the dielectric layer. A via 514 extends through dielectric layer 506, dielectric layer 508, and a cutout portion 516 of shield 504 to couple routing 220 to transmitter electrode 316.

One example technique for manufacturing a capacitive sensor device 300 with the configuration illustrated in FIG. 5 is now provided. A transparent conductive material such as ITO may be laid down on a substrate to form the transmitter and receiver electrodes. Subsequently, a dielectric layer is laid down to form the dielectric segment 321 (which will be under the jumper 319 when the jumper 319 is laid down) and the dielectric segment 315 (which will be under the routings 220 when the routings 220 are laid down). Then, a metal layer or a transparent conductive material such as ITO is laid down to form a shield 504 in the overhang region 222 as well as the jumper 319. Then, a dielectric material is laid down to form the segments of the dielectric layer 508 under the routings 220. The routings 220 are laid down over this dielectric segment. Then, a metal layer is laid down to form the jumper 319 and to form the routings 220. Another metal layer may be printed in the border region 214 (shown in FIGS. 2 and 3) to route the routings 220 to the processing system (not shown). The portion that is printed in the border region 214 constitutes the border region portion 230, 330 of the routings 220.

Figure 6:
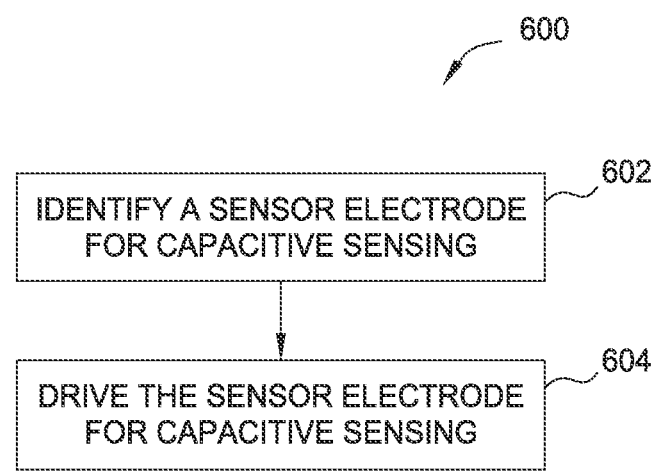
FIG. 6 is a flow diagram of method steps for driving sensor electrodes for capacitive touch sensing, according to an example.

FIG. 6 is a flow diagram of method steps for driving sensor electrodes 216 for capacitive touch sensing, according to an example. Although the method steps are described in conjunction with FIGS. 1-5, persons skilled in the art will understand that any system configured to perform the method steps, in various alternative orders, falls within the scope of the present disclosure.

As shown, a method 600 begins at step 602, in which a processing system 110 identifies a sensor electrode for capacitive sensing. At step 604, the processing system 110 drives the sensor electrode with signals for capacitive sensing. As described above, the processing system 110 may drive a transmitter electrode 216 with a sensing signal and receive resulting signals with receiver electrodes 218. Processing system may then determine presence of an input object 140 in the sensing region 120 based on the resulting signals.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device, comprising:
    a plurality of sensor electrodes disposed in a first layer and within a sensor electrode region;
    a plurality of routings disposed in a second layer and within an overhang region, the plurality of routings layered with a first set of two or more of the plurality of sensor electrodes in the overhang region and electrically coupled to a second set of two or more of the plurality of sensor electrodes, wherein the second set of two or more of the plurality of sensor electrodes includes zero, one, or two of the sensor electrodes included in the first set of two or more of the plurality of sensor electrodes; and
    a plurality of display elements disposed in a viewable region, the viewable region being located within and being smaller than the sensor electrode region,
    wherein the overhang region comprises an area that includes a portion of the sensor electrode region but does not include the viewable region.

2. The input device of claim 1, further comprising:
    a dielectric layer disposed in a third layer disposed between the first layer and the second layer, the dielectric layer electrically isolating at least one sensor electrode from at least one routing.

3. The input device of claim 1, further comprising:
    a plurality of jumpers, wherein each jumper electrically couples sensor electrode elements of a sensor electrode in the plurality of sensor electrodes together.

4. The input device of claim 3, wherein the plurality of jumpers are disposed within at least a third layer disposed between the first layer and the second layer.

5. The input device of claim 1, wherein the sensor electrodes are comprised of a material that has a higher resistance than a resistance of the material of the plurality of routings.

6. The input device of claim 1, wherein the plurality of routings includes a first routing coupled to a first end of a first sensor electrode of the plurality of sensor electrodes and coupled to a second end of the first sensor electrode.

7. The input device of claim 6, wherein the first sensor electrode comprises a transmitter electrode.

8. The input device of claim 6, wherein the first sensor electrode comprises a receiver electrode.

9. The input device of claim 1, further comprising a shield layer disposed between a sensor electrode of the plurality of sensor electrodes and a routing of the plurality of routings within the overhang region.

10. The input device of claim 1, further comprising a shield layer disposed between a sensor electrode of the plurality of sensor electrodes and a routing of the plurality of routings within the overhang region.

11. An input device, comprising:
    a plurality of sensor electrodes for capacitive sensing disposed in a first layer and within a sensor electrode region comprising an areal extent of the plurality of sensor electrodes; and
    a plurality of routings disposed in a second layer and within a border region of the sensor electrode region, the plurality of routings layered with a first set of two or more of the plurality of sensor electrodes in the border region and electrically coupled to a second set of two or more of the plurality of sensor electrodes, wherein the second set of two or more of the plurality of sensor electrodes includes zero, one, or two of the sensor electrodes included in the first set of two or more of the plurality of sensor electrodes.

12. The input device of claim 11, further comprising:
    a dielectric layer disposed in a third layer disposed between the first layer and the second layer, the dielectric layer electrically isolating at least one sensor electrode from at least one routing.

13. The input device of claim 11, further comprising:
    a plurality of jumpers, wherein each jumper electrically couples sensor electrode elements of a sensor electrode in the plurality of sensor electrodes together.

14. The input device of claim 13, wherein the plurality of jumpers are disposed within at least a third layer disposed between the first layer and the second layer.

15. The input device of claim 11, wherein the sensor electrodes are comprised of a material that has a higher resistance than a resistance of the material of the plurality of routings.

16. The input device of claim 11, wherein the plurality of routings includes a first routing coupled to a first end of a first sensor electrode of the plurality of sensor electrodes and to a second end of the first sensor electrode.

17. The input device of claim 16, wherein the first sensor electrode comprises a transmitter electrode.

18. The input device of claim 16, wherein the first sensor electrode comprises a receiver electrode.

19. A method for performing capacitive sensing in an input device, the method comprising:
    identifying a sensor electrode for capacitive sensing, the sensing electrode being included in a plurality of sensor electrodes of the input device; and
    driving the sensor electrode with a sensing signal for capacitive sensing, the sensing electrode being included in a plurality of sensor electrodes of the input device,
    wherein:
        the plurality of sensor electrodes are disposed in a first layer and within a sensor electrode region,
        a plurality of routings are disposed in a second layer and within an overhang region, the plurality of routings layered with a first set of two or more of the plurality of sensor electrodes in the overhang region and electrically coupled to a second set of two or more of the plurality of sensor electrodes, wherein the second set of two or more of the plurality of sensor electrodes includes zero, one, or two of the sensor electrodes included in the first set of two or more of the plurality of sensor electrodes, a plurality of display elements are disposed in a viewable region, the viewable region being located within and being smaller than the sensor electrode region, and the overhang region comprises an area that includes a portion of the sensor electrode region but does not include the viewable region.

20. The method of claim 19, further comprising:

receiving a resulting signal with the plurality of sensor electrodes; and determining a position of an input object based on the resulting signal.

* * * * *